US006708114B1

(12) United States Patent
Milligan

(10) Patent No.: US 6,708,114 B1
(45) Date of Patent: Mar. 16, 2004

(54) INTEGRATED FOREST DATA COLLECTION SYSTEM AND METHOD

(75) Inventor: Mark M. Milligan, Tallahassee, FL (US)

(73) Assignee: Forestech Consulting, Inc., Tallahassee, FL (US)

( * ) Notice: Subject to any disclaimer, the term of this patent is extended or adjusted under 35 U.S.C. 154(b) by 0 days.

(21) Appl. No.: 10/430,767

(22) Filed: May 6, 2003

(51) Int. Cl.[7] ................... G01C 21/30; G01C 21/26
(52) U.S. Cl. ............... 701/213; 701/200; 73/178 R; 340/988; 340/995.16; 340/995.24
(58) Field of Search .................. 701/213, 200, 701/207; 340/988, 989, 990, 995.16, 995.24; 73/178 R

(56) References Cited

U.S. PATENT DOCUMENTS

| | | | | |
|---|---|---|---|---|
| 5,126,941 A | * | 6/1992 | Gurmu et al. | 701/24 |
| 5,247,439 A | * | 9/1993 | Gurmu et al. | 701/24 |
| 5,297,049 A | * | 3/1994 | Gurmu et al. | 701/117 |
| 5,504,683 A | * | 4/1996 | Gurmu et al. | 701/117 |
| 6,314,368 B1 | * | 11/2001 | Gurmu et al. | 701/209 |

* cited by examiner

Primary Examiner—William A. Cuchlinski, Jr.
Assistant Examiner—Olga Hernandez
(74) Attorney, Agent, or Firm—John Wiley Horton

(57) ABSTRACT

An integrated data collection system which automates the collection of timber cruise data. A navigation system is integrated with a data collection system so that real-time positional data is fed directly into the data collection system. The invention guides a forester along a pre-defined cruise route and alerts the forester when a destination point is reached. The forester is then prompted to initiate a data collection cycle. Position data, cruise grid data (such as plot number), and other information is then automatically transferred from the navigation system to the data collection system. When the forester then inputs tree data (such as height, diameter, etc.), that data is automatically linked to the positional and cruise grid data transferred from the navigation system.

8 Claims, 4 Drawing Sheets

INTEGRATED FOREST DATA COLLECTION SYSTEM AND METHOD

BACKGROUND OF THE INVENTION

1. Field of the Invention.

This invention relates to the field of forestry. More specifically, the invention comprises an integrated data collection system for use in sampling the timber characteristics within a predefined survey region.

2. Description of the Related Art.

Good timber management requires the periodic evaluation of the timber within a predefined region. Since a forest may contain a hundred or more trees per acre, it is impractical to measure every tree. Statistical sampling techniques have been developed to allow an accurate evaluation based on actual measurements of a small percentage of the trees. FIG. 1 shows a representative survey region 10. A forester has created a cruise grid 12, which may correspond to the outline of a piece of property or other factors. Cruise grid 12 has been subdivided into a series of plots 14. Typically, 5–20 trees and other vegetative and descriptive measures are taken within each plot. These measurements represent only a small percentage of the growth within the plot. Thus, it is important to appropriately size the plots in order to obtain a statistically reliable sample. Numerous prior art techniques are used to create plots and cruise grids. Those skilled in the art will know that plots need not be rectangular. They may be circular. Thus, the plots illustrated are merely representative of the possibilities.

Each plot 14 contains a destination point 16. Destination point 16 is a position at which data will be collected for a particular plot 14. In the view as shown, each destination point 16 lies in the center of its respective plot 14. It need not always be centered. Numerous prior art techniques are used to determine the appropriate position for a particular destination point 16. However, simply centering the destination point within the plot is common. Data will typically be collected in a fixed radius circle proximate each destination point 16.

FIG. 2 shows a plan view of cruise grid 12. Since the forester must move between destination points—often by walking or using an ATV—it is desirable to map the shortest route which will cover all the points. One such route is shown as cruise route 20 in the view. Planning the route must often consider ingress/egress points, such as access road 18.

In order to survey cruise grid 12, a forester would move along cruise route 20, stopping at each destination point 16. At a particular destination point, the forester takes data samples of a specific number of trees. Data collected might include diameter, height, and some indication of overall quality. All these techniques were employed using old methods. The forester typically had a paper map. He or she would estimate distances walked or occasionally measure them using standard ropes or chains. A compass was typically used for navigation. The data collected would then be manually recorded in a notebook or similar article. It is obviously important to know the forester's position relative to the desired destination point. The manual techniques were somewhat inaccurate in this regard, but an experienced forester was able to cope well enough to produce useful results.

The wide availability of computer and Global Positioning System ("GPS") technology has changed the timber cruising process. Recent GPS systems, especially those equipped with the Wide Area Augmentation System ("WAAS") can obtain positional accuracy of about 3 meters. Such a system allows a forester to know his or her position without resorting to survey-type navigational aids. The forester can use a hand-held GPS to precisely navigate to a series of destination points within a cruise grid.

Portable computers have likewise replaced paper notebooks for data collection. The forester can carry one of these computers along while conducting the timber cruise. Data can then be typed into the computer and stored on a disk drive for subsequent downloading to a conventional computer. The prior art thus contemplates that a timber cruise such as the one depicted can be carried out in the following fashion:

1. The forester uses computer software and data links to obtain a map of the region and define the region of timber that is to be surveyed;
2. The forester uses computer software to divide the area into a series of plots, thereby creating a cruise grid;
3. The forester defines an appropriate destination point within each plot and stores the coordinates (latitude/longitude) of each such point;
4. The forester defines a cruise route to cover the destination points;
5. The forester physically goes to the scene and navigates to the first destination point using a GPS unit;
6. The forester collects data at the first destination point;
7. The forester manually enters the location of the first destination point, the plot number, other identifying information, and the tree data collected into a portable computer; and
8. The forester repeats this process for each destination point until the cruise route is completed.

BRIEF SUMMARY OF THE INVENTION

The present invention comprises an integrated data collection system which automates the collection of timber cruise data. A navigation system is integrated with a data collection system so that real-time positional data is fed directly into the data collection system. The invention guides a forester along a pre-defined cruise route and alerts the forester when a destination point is reached. The forester is then prompted to initiate a data collection cycle. Position data, cruise grid data (such as plot number), and other information is then automatically transferred from the navigation system to the data collection system. When the forester then inputs tree data (such as height, diameter, etc.), that data is automatically cross-linked to the positional and cruise grid data transferred from the navigation system.

REFERENCE NUMERALS IN THE DRAWINGS

| | | | |
|---|---|---|---|
| 10 | survey region | 12 | cruise grid |
| 14 | plot | 16 | destination point |
| 18 | access road | 20 | cruise route |
| 22 | data collection set | 24 | harness |
| 26 | shoulder strap | 28 | GPS antenna |
| 30 | GPS unit | 32 | power supply |
| 34 | data cable | 36 | computer |
| 38 | display | 40 | keypad |

DETAILED DESCRIPTION OF THE INVENTION

Figure 1:
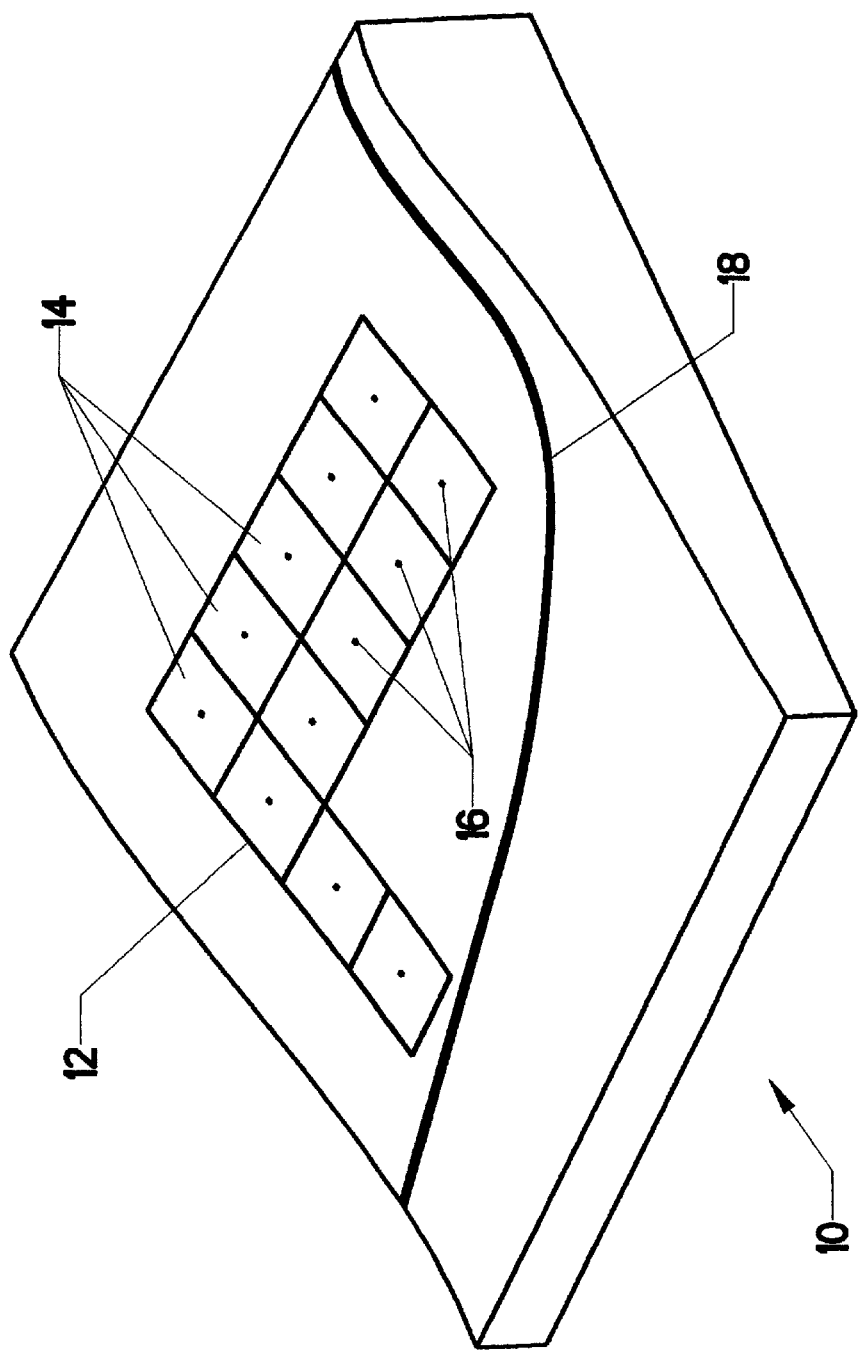
FIG. 1 is an isometric view, showing a survey region.
Figure 2:
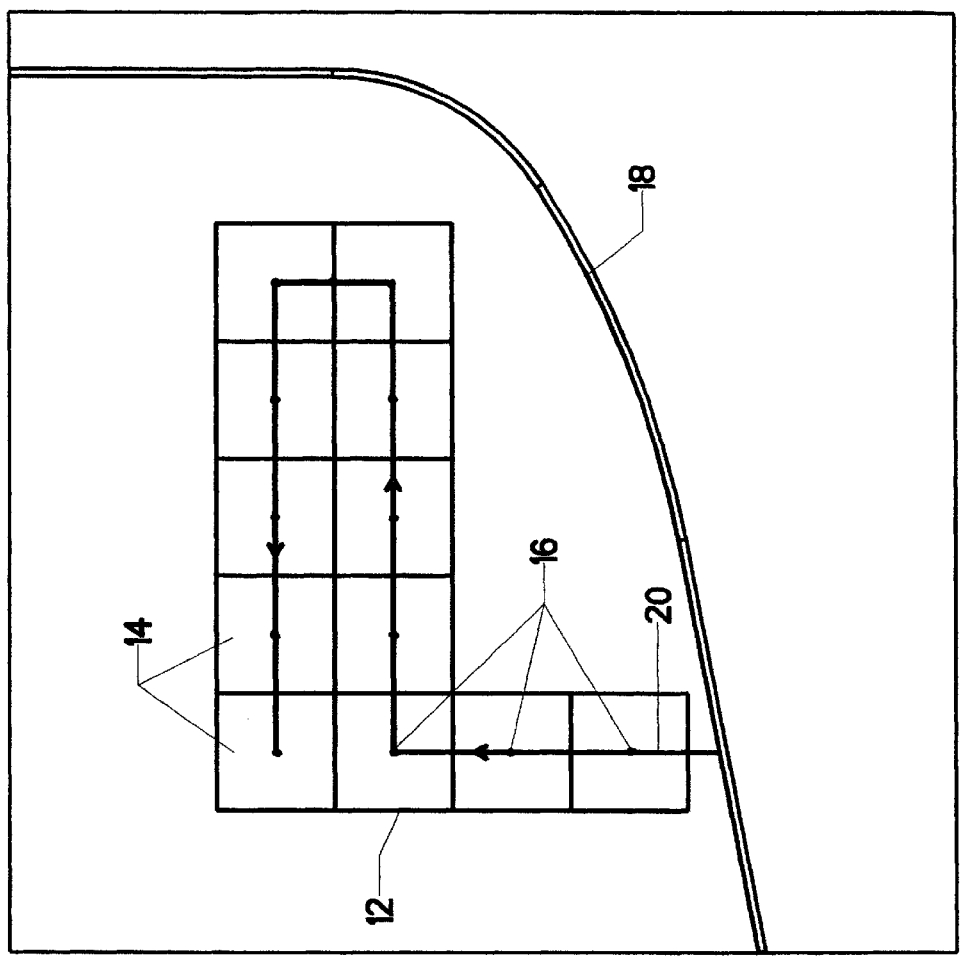
FIG. 2 is a plan view of the survey region.
Figure 3:
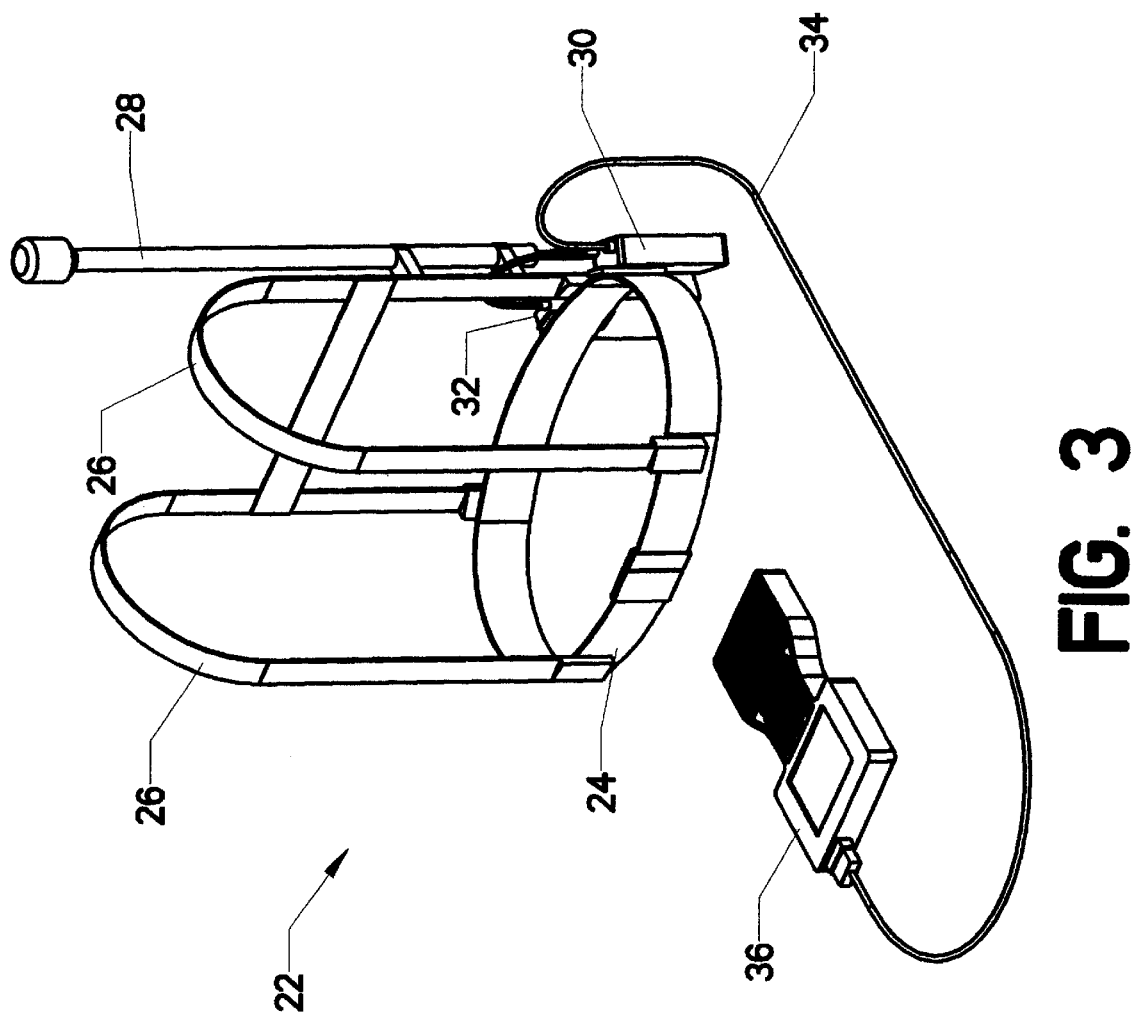
FIG. 3 is an isometric view, showing typical hardware used by the present invention.

FIGS. 1 and 2, along with the preceding descriptions, describe the general timber cruising process. FIG. 3 shows a hardware set used in the present invention. Timber cruising is typically done on a small ATV or on foot. Thus, the hardware employed must be portable. It is convenient to house the hardware in a user-wearable harness. FIG. 3 shows one such harness 24. Harness 24 includes a belt attached to two shoulder straps 26. The user wears the device by slipping the two shoulder straps 26 over the shoulders and fastening the belt around the waist. A buckle is provided. Adjustment features would also ordinarily be provided. These have been omitted in the view for purposes of visual clarity.

Data collection set 22 includes harness 24 plus the attached hardware. Power supply 32, typically a rechargeable battery, is attached to harness 24. An alternative would be to supply each of the components with its own power supply, but the use of a unified source simplifies recharging.

GPS unit 30 is also attached to harness 24. It is electrically connected to power supply 32. GPS antenna 28 is also connected to GPS unit 30. This antenna, which can assume many forms known in the art, increases the accuracy of the GPS data.

Computer 36 is of the hand-held variety. It is connected to GPS unit 30 via data cable 34. When not in use, computer 36 can be attached to harness 24 so that the user need not carry it. The reader should appreciate that the particular type of harness shown is merely representative. A vest can be used in the same way (such as a photographer's or hunter's vest). The components could likewise be stored in a jacket or many other types of clothing modified to suit the purpose. The term "harness" is intended to refer generally to any type of clothing that attaches to a user and supports the various components described.

Figure 4:
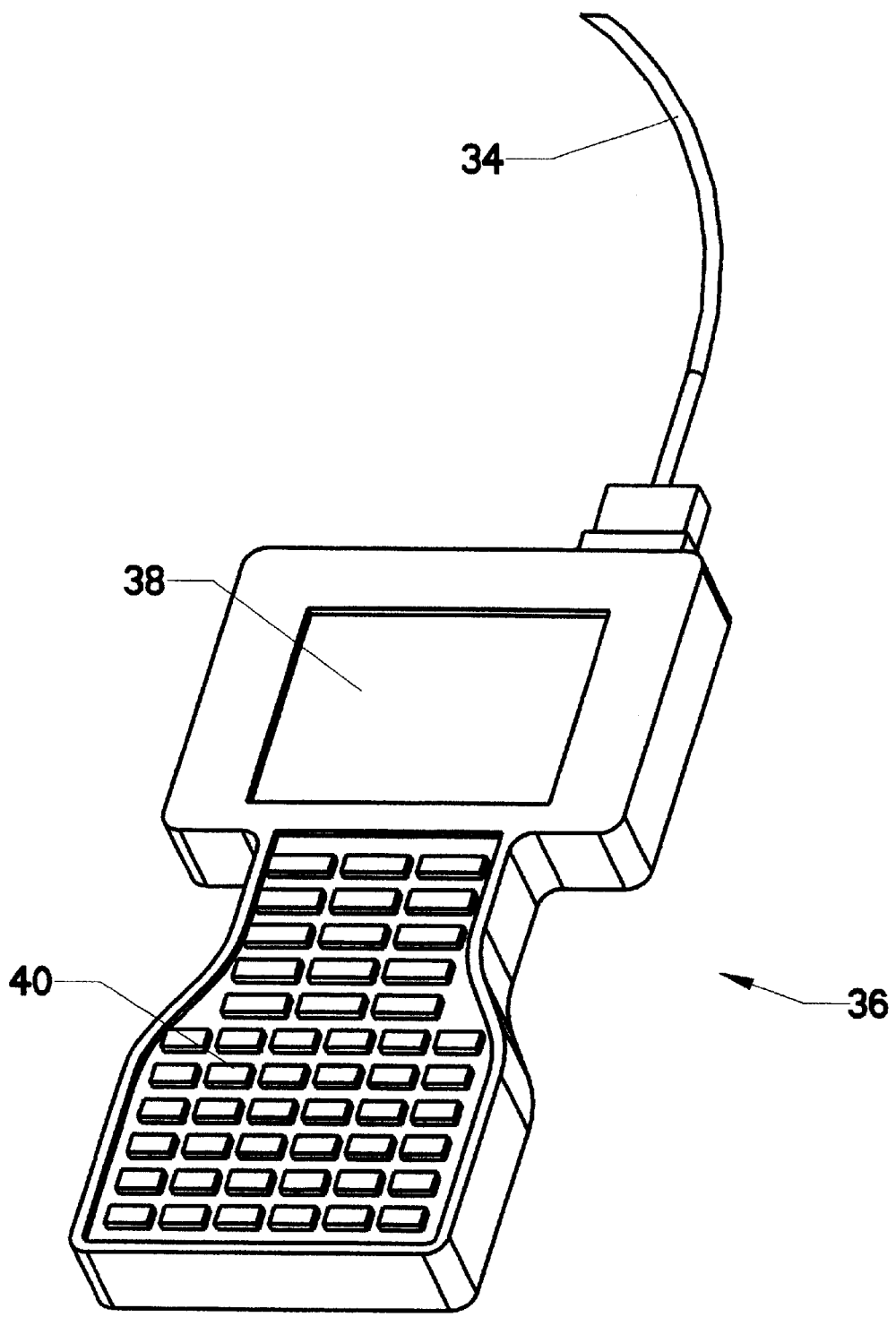
FIG. 4 is an isometric view, showing details of the hardware used by the present invention.

FIG. 4 shows computer 36 in more detail. There are presently many types of hand-held, portable computers. The particular model shown runs WINDOWS/CE, a presently common operating system. A large LCD display 38 is provided. A keypad 40 is also provided. Data cable 34 attaches to a port in the upper portion of the computer, as shown. The user need not leave data cable 34 attached. It is only needed during actual operations.

An understanding of how the invention is used is best presented in the full context of timber cruising operations. Returning to FIG. 1, the reader will recall that a forester typically creates a cruise grid 12 before actually surveying a site. Cruise grid 12 is divided into a plurality of plots 14, each of which contains a destination point 16. Turning now to FIG. 2, the reader will recall that the forester defines a cruise route 20 which will efficiently pass through each of the destination points 16. These operations are now typically done using computer software, such as SOLO (a presently available GPS/GIS example).

The routes and points shown in FIG. 2 can be created directly using the portable computer 36. As an alternative, they can be created using another computer—such as a desktop—and downloaded to computer 36. Computer 36 preferably uses a windows-style interface. Color graphical and text data are preferably displayed to the user on display 38. Thus, once the user goes into the field, he or she can see terrain data, destination points, the cruise route, and associated textual information on display 38. User interface devices—such as a stylus—are also provided. These allow the user to interact with the WINDOWS menus.

Computer 36 can also run a timber data collection package such as TCRUISE. SOLO and TCRUISE are typically run simultaneously on computer 36. An interface module between these two pieces of software is also provided.

Once the user is ready to travel over the cruise route 20 shown in FIG. 2, he or she switches on all the components of data collection set 22. Computer 36 runs both the GPS/GIS software (such as SOLO) and the timber data collection software (such as TCRUISE). For purposes of clarity, the following descriptions will refer to SOLO and TCRUISE. However, the reader should bear in mind that other GPS/GIS systems could be substituted for SOLO and other data collection systems could be substituted for TCRUISE. The user typically brings up a graphical map data on display 38. The user then moves in the direction of the first destination point 16.

Real-time positional data is fed from GPS unit 30 to computer 36. This data is fed into the SOLO software. The user's heading, location, bearing to target, and other common navigation features are typically displayed on display 38. One goal of the process is to collect data near each of the destination points. The user sets a tolerance distance. This distance represents the maximum error between the position where data is actually collected and the desired destination point. This tolerance distance is entered into SOLO.

Once the user comes within the tolerance distance from a destination point, the software causes an alert signal to be produced. The purpose of this alert signal is to inform the user that the destination point has been reached. It can be an audible signal, a visual signal (such as a flashing light or a message on display 38), or other conventional means of alerting a human operator. Once the signal is produced, the software asks the user whether he or she wants to collect timber data. If the user responds affirmatively, the aforementioned interface module opens TCRUISE.

TCRUISE provides an input screen which asks for typical timber data. The user surveys the trees within a region surrounding the destination point. A typical survey would measure all trees with in a fixed radius circle centered on the destination point. Typical values measured include tree height, diameter, product, species, and strata (an industry-specific term referring to the general quality and type of the tree).

The interface module automatically cross-links the data entered by the user to the positional and navigational data. As an example, when the user enters a particular plot's measurements in TCRUISE, the user's latitude, longitude, and plot number will be automatically transferred from SOLO into TCRUISE and cross-linked with the entered data. The data is often entered in a spreadsheet format. For a particular plot or point, the user might type in data as to tree species, diameters, appropriate product uses, and heights, to name a few. In the spreadsheet, the plot's latitude, longitude, and plot number would also appear. This additional data is entered into the spreadsheet automatically; i.e., the user does not have to enter it.

Once the survey at a specific destination point is complete, the user exits out of TCRUISE. SOLO then displays navigational information directing the user to the next destination point. The process is then repeated for each destination point. Once the cruise route is completed, the user will have compiled a large set of tree data. The present invention will have automatically cross-linked position data, plot data, and stratum data to the measurements taken. Thus, the reader will appreciate that the present invention allows the user to focus on those activities which can best be carried out by the user (tree measurement and evaluation), while automating those activities which can be carried out by the navigation system and computer.

The preceding description contains significant detail regarding the novel aspects of the present invention. It is should not be construed, however, as limiting the scope of the invention but rather as providing illustrations of the preferred embodiments of the invention. Thus, the scope of the invention should be fixed by the following claims, rather than by the examples given.

Having described my invention, I claim:

1. A method allowing a user to gather forestry data within a survey region, comprising:
   a. defining a plurality of plots within said cruise region;
   b. defining a destination point within each of said plurality of plots;
   c. defining a cruise route by which said user will visit each of said destination points;
   d. providing a portable navigation system with memory means storing said cruise route, which assists said user in navigating along said cruise route;
   e. providing an alert signal from said navigation system which alerts said user when said user is within a selected tolerance distance of one of said destination points;
   f. providing a portable computer with data input means allowing said user to input a plurality of observed tree data for storage therein, once said user arrives at one of said destination points; and
   g. providing a data link from said navigation system to said computer, whereby each entry of said observed tree data is cross-linked as to its position as determined by said navigation system, and the specific plot and destination point in which said user is collecting said data.

2. A method as recited in claim 1, wherein said navigation system determines a location for said user via the Global Positioning System.

3. A method as recited in claim 1, wherein said alert signal is an audible tone.

4. A method as recited in claim 1, wherein said alert signal is a visual signal.

5. A data collection system allowing a user to gather forestry data within a survey region, comprising:
   a. a navigation system;
   b. a portable computer, including data input means allowing said user to input said forestry data into said computer for storage therein;
   c. a data link between said navigation system and said computer which feeds positional data from said navigation system to said computer so that as said user inputs said forestry data, said forestry data is cross-linked with said positional data from said navigation system, and the specific plot and destination point in which said user is collecting said data; and
   d. a harness mounting said navigation system, said computer, and said data link, wherein said harness is wearable by said user.

6. A data collection system as recited in claim 5, wherein said navigation system determines a location for said user via the Global Positioning System.

7. A data collection system as recited in claim 5, further comprising an audible tone generating device for alerting said user when said user is within a selected tolerance distance of a predefined destination point.

8. A data collection device as recited in claim 5, further comprising a visible signal generating device for alerting said user when said user is within a selected tolerance distance of a predefined destination point.

* * * * *